US010822069B2

(12) United States Patent
Ebihara

(10) Patent No.: US 10,822,069 B2
(45) Date of Patent: Nov. 3, 2020

(54) REVERSE GEAR AND WATERCRAFT EQUIPPED WITH THE SAME

(71) Applicant: Kanzaki Kokyukoki Mfg. Co., Ltd., Amagasaki-shi, Hyogo (JP)

(72) Inventor: Tomoyuki Ebihara, Amagasaki (JP)

(73) Assignee: KANZAKI KOKYUKOKI MANUFACTURING CO., LTD., Hyogo (JP)

( * ) Notice: Subject to any disclaimer, the term of this patent is extended or adjusted under 35 U.S.C. 154(b) by 626 days.

(21) Appl. No.: 15/711,399

(22) Filed: Sep. 21, 2017

(65) Prior Publication Data
US 2018/0079478 A1    Mar. 22, 2018

(30) Foreign Application Priority Data

Sep. 21, 2016  (JP) ................................ 2016-184740

(51) Int. Cl.
| | |
|---|---|
| *B63H 23/08* | (2006.01) |
| *B63H 23/30* | (2006.01) |
| *F16H 3/14* | (2006.01) |
| *F16H 3/08* | (2006.01) |
| *B63H 23/02* | (2006.01) |

(52) U.S. Cl.
CPC ............ *B63H 23/08* (2013.01); *B63H 23/30* (2013.01); *F16H 3/14* (2013.01); *F16H 3/145* (2013.01); *B63H 2023/0283* (2013.01); *F16H 2003/0822* (2013.01)

(58) Field of Classification Search
CPC ........... F16H 3/14; F16H 3/145; B63H 23/08; B63H 23/30

USPC ............................................... 74/355
See application file for complete search history.

(56) References Cited

U.S. PATENT DOCUMENTS

| | | | | |
|---|---|---|---|---|
| 4,938,723 | A | * | 7/1990 | Yoshimura ............. B63H 20/14 440/52 |
| 5,403,218 | A | * | 4/1995 | Onoue .................. B63H 20/002 192/48.91 |
| 5,879,210 | A | * | 3/1999 | Goto ...................... B63H 20/20 192/3.63 |
| 6,217,400 | B1 | * | 4/2001 | Natsume ................ B63H 20/20 440/75 |

(Continued)

FOREIGN PATENT DOCUMENTS

| | | |
|---|---|---|
| JP | H06078637 A | 11/1994 |
| JP | H0717486 A | 1/1995 |

*Primary Examiner* — Ha Dinh Ho
(74) *Attorney, Agent, or Firm* — Canto Colburn LLP

(57) ABSTRACT

A reverse gear includes an input shaft, a forward clutch, a reverse clutch, an output shaft, a reduction mechanism, and a relay shaft. The input shaft receives rotational power of a main engine. The forward clutch transmits the rotational power of the input shaft as forward output. The reverse clutch transmits the rotational power of the input shaft as reverse output. The output shaft outputs the rotational power transmitted via the forward clutch and the reverse clutch. The reduction mechanism reduces the rotational power of the output shaft and transmits the reduced rotational power to the propeller shaft. The relay shaft intersects the input shaft and relays the rotational power from the forward clutch and the reverse clutch toward the output shaft. The relay shaft and the output shaft are coupled to each other via a pair of intersecting-shaft gears to be able to transmit power.

5 Claims, 13 Drawing Sheets

(56) References Cited

U.S. PATENT DOCUMENTS

| | | | | |
|---|---|---|---|---|
| 7,621,792 B2* | 11/2009 | Fukuoka | ............... | B63H 20/245 |
| | | | | 440/89 R |
| 7,704,183 B2* | 4/2010 | Nakamura | ............... | B63H 5/10 |
| | | | | 440/80 |
| 8,157,070 B2* | 4/2012 | Okanishi | ................ | B63H 23/30 |
| | | | | 192/48.619 |
| 9,586,666 B2* | 3/2017 | Hedlund | ................ | B63H 21/20 |
| 9,731,803 B2* | 8/2017 | Achiwa | ................ | B63H 23/30 |
| 10,457,372 B2* | 10/2019 | Hashimoto | ............. | F16D 41/04 |
| 2016/0114877 A1* | 4/2016 | Hedlund | ................ | B63H 21/20 |
| | | | | 74/665 B |

* cited by examiner

REVERSE GEAR AND WATERCRAFT EQUIPPED WITH THE SAME

CROSS-REFERENCE TO RELATED APPLICATIONS

The present application claims priority under 35 U.S.C. § 119 to Japanese Patent Application No. 2016-184740, filed Sep. 21, 2016. The contents of this application are incorporated herein by reference in their entirety.

BACKGROUND OF THE INVENTION

Field of the Invention

The present invention relates to reverse gears that transmit rotational power of a main engine to a propeller. The present invention also relates to watercrafts equipped with such a reverse gear.

Discussion of the Background

Japanese Unexamined Patent Application Publication No. 7-17486 and Japanese Unexamined Utility Model Application Publication No. 6-78637 disclose reverse gears (marine gears) for watercrafts such as ski boats and pleasure boats. Such a reverse gear includes a forward clutch and a reverse clutch, which shift rotational power of an engine among forward rotation, neutral, and reverse rotation, and a reduction gear mechanism, which reduces the rotational power transmitted via the forward clutch or the reverse clutch and transmits the reduced rotational power to a propeller shaft.

The contents of Japanese Unexamined Patent Application Publication No. 7-17486 and Japanese Unexamined Utility Model Application Publication No. 6-78637 are incorporated herein by reference in their entirety.

It has been desired to achieve commonality of platforms (basic design) among models of the reverse gear as much as possible to reduce costs and effectively use resources by simplifying the process for producing the reverse gears. However, since the size of the reverse gear generally differs depending on models and specifications in accordance with the engine and the work capacity, the commonality of components and the ease in developing variations have not been considered. Unfortunately, such a situation does not respond to the increasing demand for cost reduction and effective use of resources.

It has also been desired to increase the internal occupant's space in, for example, ski boats. In this respect, the size of the reverse gear that is often mounted adjacent to the occupant's space needs to be reduced as much as possible. However, in the conventional reverse gear, the forward clutch, the reverse clutch, and the reduction gear mechanism are arranged one above the other and are accommodated in the housing. Thus, the housing is correspondingly sized and does not respond to the demand for the size reduction with such a configuration.

Accordingly, it is a technical object of the present invention to provide a reverse gear that has been improved upon consideration of the above-mentioned current state and to provide a watercraft equipped with the reverse gear.

SUMMARY OF THE INVENTION

According to one aspect of the present invention, a reverse gear includes an input shaft, a forward clutch, a reverse clutch, an output shaft, a reduction mechanism, and a relay shaft. The input shaft is configured to receive rotational power of a main engine. The forward clutch is configured to transmit the rotational power of the input shaft as forward output. The reverse clutch is configured to transmit the rotational power of the input shaft as reverse output. The output shaft is configured to output the rotational power transmitted via the forward clutch and the reverse clutch to a propeller shaft. The relay shaft intersects the input shaft and is configured to relay the rotational power from the forward clutch and the reverse clutch toward the output shaft. The relay shaft and the output shaft are coupled to each other via a pair of intersecting-shaft gears to be able to transmit power.

In the first aspect of the present invention, the forward clutch and the reverse clutch may be disposed on the relay shaft.

In the first aspect of the present invention, the output shaft and the propeller shaft may be coupled to each other via the reduction mechanism to be able to transmit power. The reduction mechanism may include a pair of cylindrical gears.

In the first aspect of the present invention, the forward clutch and the reverse clutch may have a different clutch capacity from each other.

According to another aspect of the present invention, a watercraft includes the above-described reverse gear.

According to the embodiment of the present invention, the relay shaft intersects the input shaft and is configured to relay the rotational power from the forward clutch and the reverse clutch toward the output shaft. The relay shaft and the output shaft are coupled to each other via a pair of intersecting-shaft gears to be able to transmit power. Thus, depending on the positional relationship between the pair of intersecting-shaft gears, which are engaged with each other, the inclination angle of the output shaft with respect to the input shaft as viewed from the side and thus the shaft angle of the propeller shaft can be set to various angles. Thus, for example, in the V-drive reverse gear, the shaft angle of the propeller shaft may be easily increased. The reverse gear may be easily changed to an angle-drive reverse gear or to a parallel-shaft reverse gear. That is, the reverse gear is easily applied to a plurality of models and specifications of a watercraft 1 only by developing variations of an outer case (housing) without changing the basic structure of the power transmission in the reverse gear. This eliminates the need for producing the reverse gear that differs depending on models and specifications and thus reduces the production costs of models and specifications as a whole.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Hereinafter, an embodiment of the present invention will be described with reference to the drawings. In the following description, when terms indicating a specific direction or a position (for example, "left and right" and "up and down") are used as required, the bow of a watercraft will be referred to as the front, the stern of the watercraft will be referred to as the rear, and the front and rear are used as a reference. The watercraft is a ski boat 1 in this embodiment. The terms are used for convenience of the description and do not intend to limit the technical range of the present invention.

Figure 1:
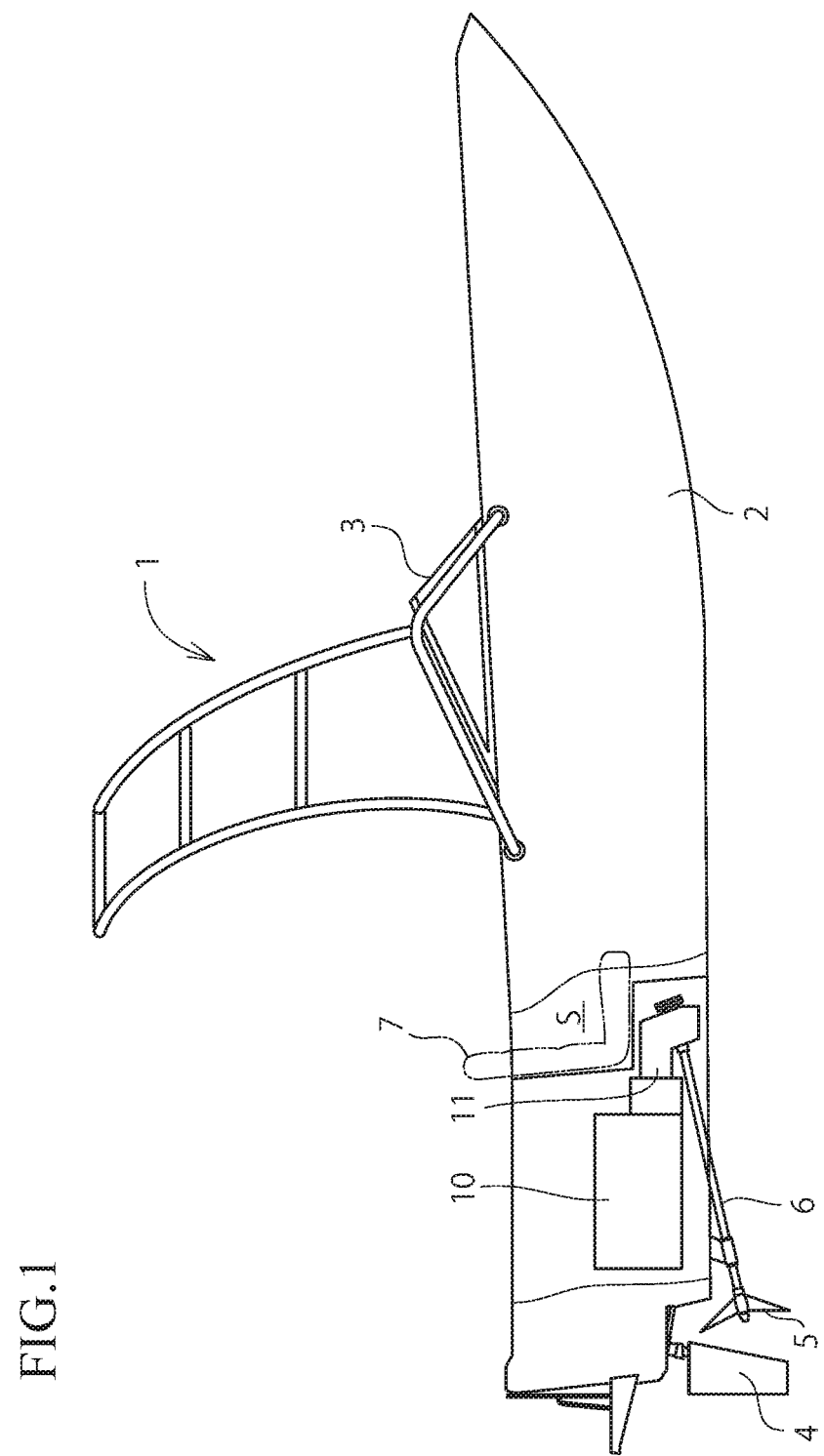
FIG. 1 is a schematic side view of a ski boat.
Figure 2:
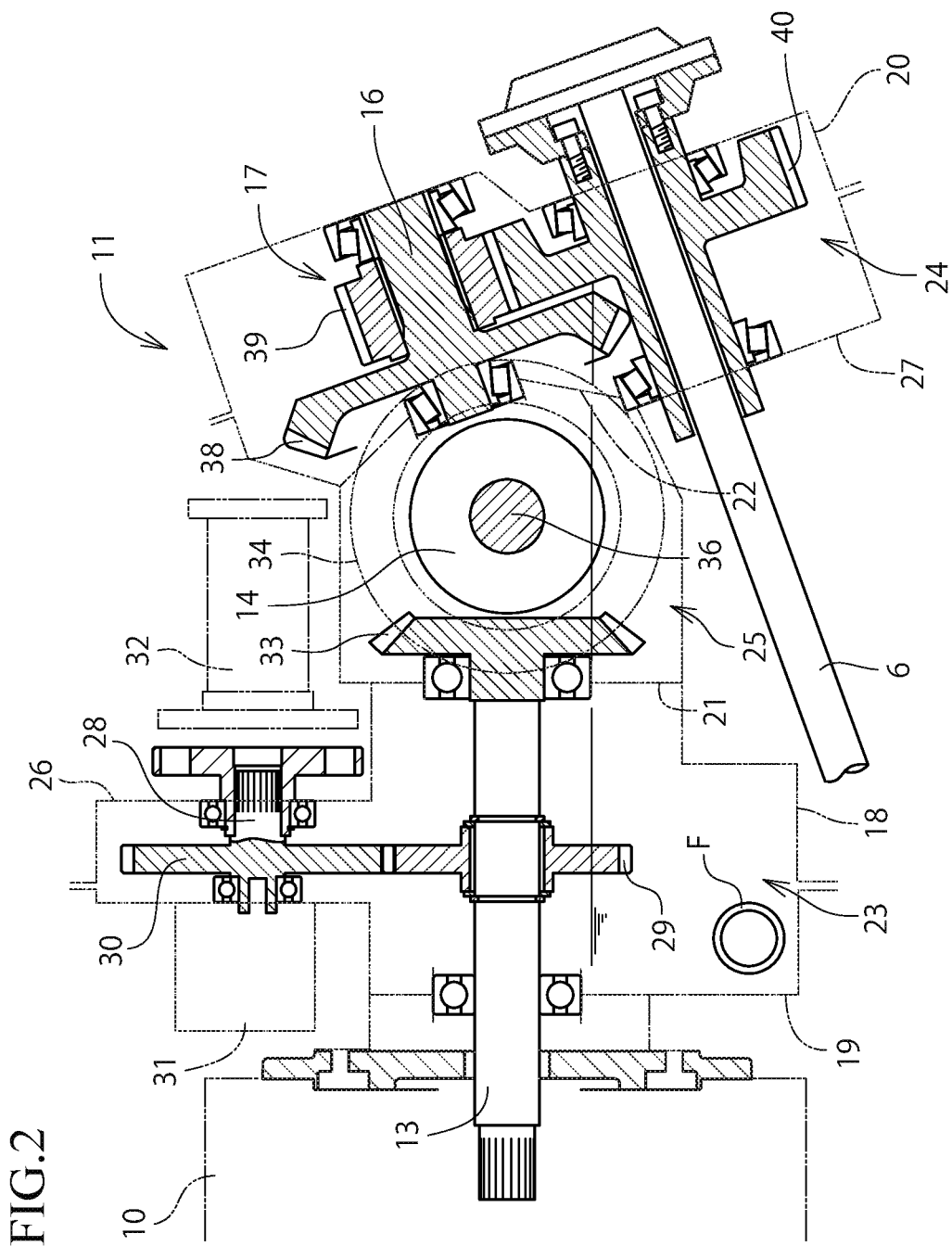
FIG. 2 is a schematic cross-sectional side view of a reverse gear according to a first embodiment.
Figure 3:
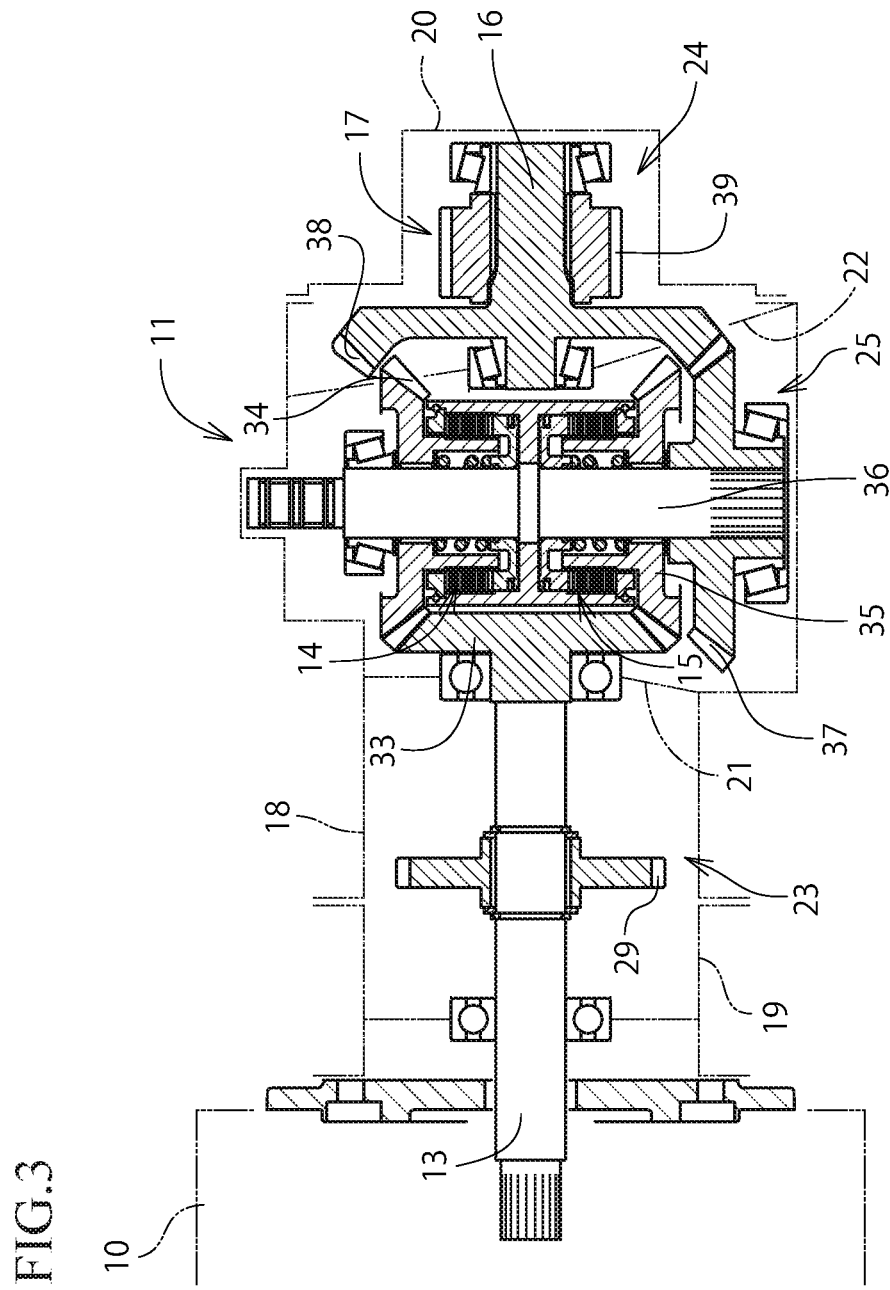
FIG. 3 is a schematic cross-sectional plan view of the reverse gear.
Figure 4:
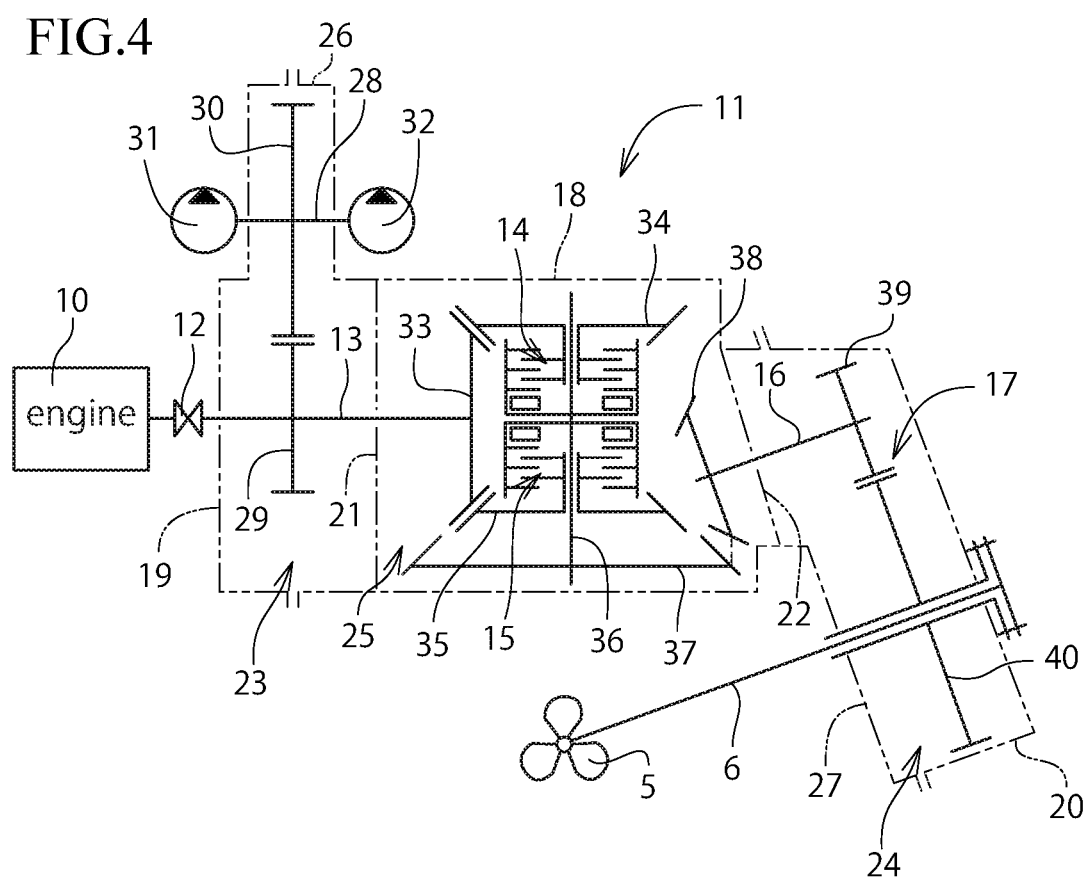
FIG. 4 is a single-line diagram of a power transmission system.
Figure 5:
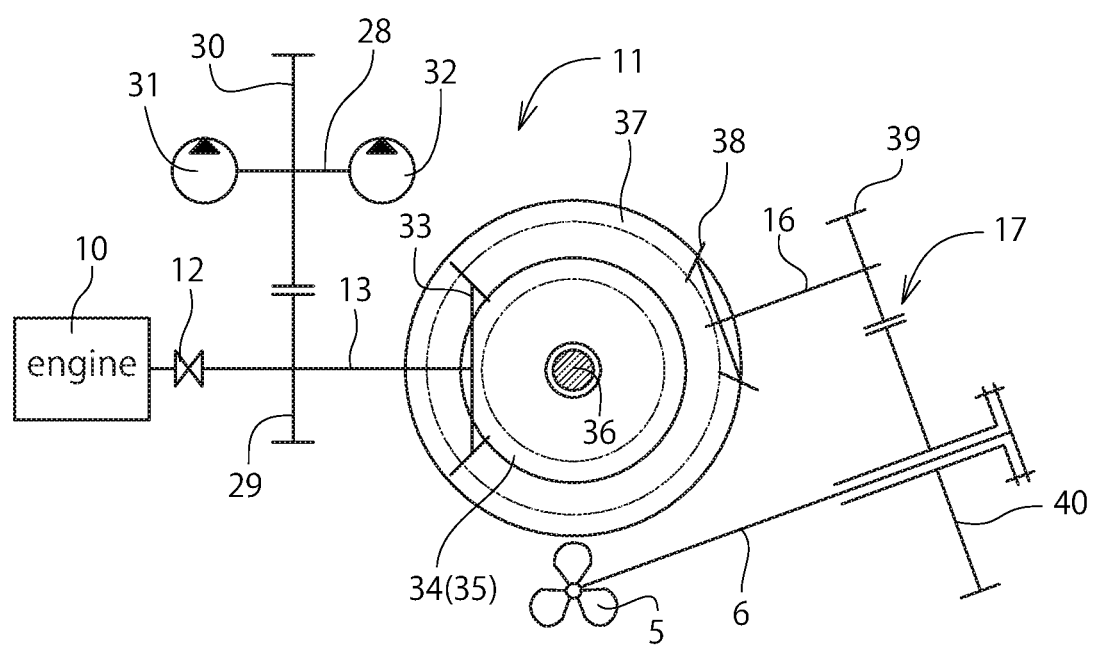
FIG. 5 is a single-line diagram illustrating the positional relationship between a pair of bevel gears engaged with each other.

As illustrated in FIG. 1, the ski boat 1, which is the watercraft, includes a hull 2, a cockpit 3, a rudder 4, and a propeller 5. The cockpit 3 is located on the upper surface of the hull at the center. The rudder 4 is provided on the bottom of the hull 2 at the watercraft's stern. The propeller 5 is located in front of the rudder 4 on the bottom of the hull 2 at the watercraft's stern. A propeller shaft 6 is supported on the bottom of the hull 2 at the watercraft's stern. The propeller shaft 6 rotates the propeller 5. The propeller 5 is secured to the projecting end of the propeller shaft 6.

Although detailed illustration is omitted, a steering wheel, a forward/reverse manipulator, a dead-slow travel manipulator, and a speed manipulator are provided in the cockpit 3. The steering wheel changes the traveling direction of the hull 2 to left and right by steering. The forward/reverse manipulator shifts the traveling direction of the hull 2 between forward and reverse. The forward/reverse manipulator is a forward/reverse lever. The dead-slow travel manipulator causes the hull 2 to travel at dead slow. The dead-slow travel manipulator is a trawling lever. The speed manipulator sets and maintains the output rotational speed of an engine 10, which will be discussed below. The speed manipulator is a throttle lever. The manipulators are not limited to the levers, but may be in other forms such as dials. An operator's seat 7 is located at the rear section of the cockpit 3. An occupant (operator) sits on the operator's seat 7. The inside of the cockpit 3 including the operator's seat 7 configures an occupant's space S.

A main engine, that is, a drive source of the propeller 5 is the engine 10. The engine 10 and a reverse gear 11 are provided on the inner bottom portion of the hull 2 at the watercraft's stern. The reverse gear 11 transmits the rotational power of the engine 10 to the propeller 5. The rotational power transmitted to the propeller shaft 6 from the engine 10 via the reverse gear 11 drivingly rotates the propeller 5. The reverse gear 11 of the embodiment is a V-drive system in which, as viewed from the side, the shaft angle of the propeller shaft 6 is set to an acute angle (the angle between an input shaft 13 and the propeller shaft 6 is set to an acute angle as viewed from the side). The reverse gear 11 is located in front of the engine 10.

FIGS. 2 to 5 illustrate the reverse gear 11 according to a first embodiment. In the following embodiments, a case in which the rotation direction of the output shaft of the engine (the input shaft 13 of the reverse gear 11) and the rotation direction of the propeller shaft 6 are the same will be referred to as a forward direction. A case in which the rotation directions are opposite will be referred to as a reverse direction. The rotation direction of the shafts and gears will be described accordingly.

As illustrated in FIGS. 2 to 5, the reverse gear 11 of the first embodiment includes the input shaft 13, a forward clutch 14, a reverse clutch 15, an output shaft 16, and a reduction gear mechanism 17. The input shaft 13 is coupled to a flywheel 12 of the engine 10. The forward clutch 14 is able to transmit the rotational power of the input shaft 13 as forward output. The reverse clutch 15 is able to transmit the rotational power of the input shaft 13 as reverse output. The output shaft 16 outputs the rotational power transmitted via the clutches 14 and 15. The reduction gear mechanism 17 reduces the rotational power of the output shaft 16 and transmits the reduced rotational power to the propeller shaft 6.

The reverse gear 11 includes a hollow box-like housing 18. A rear lid 19 is located on the rear surface of the housing 18. The rear lid 19 is detachably fastened to the rear surface of the housing 18 with a plurality of bolts. A front lid 20 is located on the front surface of the housing 18. The front lid 20 is detachably fastened to the front surface of the housing 18 with a plurality of bolts.

A rear partition 21 and a front partition 22 are integrally formed with the housing 18 at the middle portion in the housing 18 in the fore-and-aft direction. Thus, the rear and front partitions 21 and 22 divide the inside of the housing 18 into three chambers including a rear chamber 23, a front chamber 24, and an intermediate chamber 25. The section inside of the housing 18 between the rear lid 19 and the rear partition 21 forms the rear chamber 23, and the section between the front lid 20 and the front partition 22 forms the front chamber 24. The section between the rear partition 21 and the front partition 22 forms the intermediate chamber 25. The three chambers 23 to 25 communicate with one another through notches formed in parts of the partitions 21 and 22 so that hydraulic oil (lubrication oil) inside the chambers 23 to 25 is capable of moving into one another. The lower the height of the upper surface of the housing 18, the more spacious the occupant's space S in the watercraft.

The housing 18 accommodates the input shaft 13, the forward and reverse clutches 14 and 15, the output shaft 16, the reduction gear mechanism 17, and the upstream section of the propeller shaft 6. The input shaft 13 projects rearward from the rear surface of the housing 18 (rear lid). A front downwardly extending portion 27 that bulges downward is formed on the front portion of the housing 18. The propeller shaft 6 projects diagonally downward and rearward from the rear surface of the front downwardly extending portion 27 of the housing 18 and projects from the watercraft's bottom.

The rear lid 19 rotationally supports the rear end section of the input shaft 13, and the rear partition 21 rotationally supports the front end section of the input shaft 13. The rear projecting end of the input shaft 13 is coupled to the flywheel 12 of the engine 10. A rear upwardly extending portion 26 that bulges upward is formed on the rear portion of the housing 18. The rear upwardly extending portion 26 and the rear lid 19, which are located at the rear portion of the housing 18, rotationally support a PTO shaft 28. The PTO shaft 28 extends parallel to the input shaft 13. A PTO drive gear 29 is secured to the middle portion of the input shaft 13 in the fore-and-aft direction. A PTO driven gear 30 is secured to the middle portion of the PTO shaft 28 in the fore-and-aft direction. The PTO drive gear 29 and the PTO driven gear 30 are constantly engaged with each other. Thus, the input shaft 13 and the PTO shaft 28 are constantly rotated by the rotational power when the engine 10 is driven. The PTO drive gear 29 and the PTO driven gear 30 are located in the rear chamber 23, which is between the rear lid 19 and the rear partition 21.

A gear pump 31 is secured to the rear surface of the rear lid 19 at a position of corresponding to the rear upwardly extending portion 26. The gear pump 31 is driven by the rotational power of the PTO shaft 28. A coolant pump 32 is secured to the outer surface of the front portion of the rear upwardly extending portion 26. The coolant pump 32 circulates a coolant for cooling the engine 10. Like the gear pump 31, the coolant pump 32 is driven by the rotational power of the PTO shaft 28. The housing 18 functions also as a hydraulic oil tank. The hydraulic oil inside the housing 18 is sucked by the gear pump 31 and is discharged toward the forward and reverse clutches 14 and 15. An oil filter F illustrated in FIG. 2 filters the hydraulic oil before the gear pump 31 sucks the hydraulic oil. An auxiliary device driven by the rotational power of the PTO shaft 28 is not limited to the above-mentioned gear pump 31 and the coolant pump 32.

An input bevel gear 33 and a left and right pair of forward and reverse bevel gears 34 and 35 are located in the intermediate chamber 25 between the rear partition 21 and the front partition 22. The input bevel gear 33 is fixed to the front projecting end of the input shaft 13 that projects inside the intermediate chamber 25. The forward and reverse bevel gears 34 and 35 are constantly engaged with the input bevel gear 33. A relay shaft 36 is rotationally supported in the intermediate chamber 25 in a position intersecting (orthogonal to) the input shaft 13. The relay shaft 36 relays the rotational power from the clutches 14 and 15 toward the output shaft 16. The relay shaft 36 of the first embodiment extends in the lateral direction. The forward and reverse bevel gears 34 and 35 are rotationally fitted onto positions close to the left and right ends of the relay shaft 36.

The forward clutch 14 and the reverse clutch 15 are located on the relay shaft 36. The forward clutch 14 and the reverse clutch 15 are hydraulic friction clutches and, more specifically, are multiplate wet clutches. The forward clutch 14 of the first embodiment connects and disconnects power transmission from the forward bevel gear 34 to the relay shaft 36. Similarly, the reverse clutch 15 of the first embodiment connects and disconnects power transmission from the reverse bevel gear 35 to the relay shaft 36. In the first embodiment, the forward and reverse clutches 14 and 15 are located between the forward bevel gear 34 and the reverse bevel gear 35. Thus, the forward bevel gear 34, the forward clutch 14, the reverse clutch 15, and the reverse bevel gear 35 are arranged one next to another on the relay shaft 36 of the first embodiment from the left end in this order.

The forward clutch 14 and the reverse clutch 15 have different clutch capacity from each other. Generally, the reverse traveling does not require a great propulsive force compared with the forward traveling. Thus, in the first embodiment, the clutch capacity of the reverse clutch 15 is set to be smaller than the clutch capacity of the forward clutch 14. This setting reduces the size of the mechanism for switching between the forward output and the reverse output and consequently contributes to reducing the size of the reverse gear 11.

The output shaft 16 and the upstream section of the propeller shaft 6 are rotationally supported in the front chamber 24 between the front lid 20 and the front partition 22. The output shaft 16 and the upstream section of the propeller shaft 6 extend parallel to each other. The reverse gear 11 of the embodiment is a V-drive system, and the angle between the input shaft 13 and the output shaft 16 as viewed from the side is set to an obtuse angle (the output shaft 16 extends diagonally upward and forward). The rear end section of the output shaft 16 is rotationally supported on the front partition 22, and the front end section of the output shaft 16 is rotationally supported on the inner surface of the front lid 20. The front end section of the propeller shaft 6 is rotationally supported on the inner surface of the front lid 20, and the section of the propeller shaft 6 close to the front is rotationally supported by the front downwardly extending portion 27 of the housing 18.

An output bevel gear 38 is provided on the rear portion of the output shaft 16. The output bevel gear 38 is constantly engaged with a relay bevel gear 37. The relay bevel gear 37 is secured to the right end section of the relay shaft 36. That is, the relay shaft 36 and the output shaft 16 are coupled to be able to transmit power via the relay bevel gear 37 and the output bevel gear 38. The relay bevel gear 37 and the output bevel gear 38 configure a pair of intersecting-shaft gears (a pair of bevel gears). A reduction drive gear 39 is secured to the front portion of the output shaft 16. The reduction drive gear 39 is constantly engaged with a reduction driven gear 40 on the front portion of the propeller shaft 6. That is, the output shaft 16 and the propeller shaft 6 are coupled to be able to transmit power via the reduction drive gear 39 and the reduction driven gear 40.

The reduction drive gear 39 and the reduction driven gear 40 configure a pair of cylindrical gears. The pair of cylindrical gears are the reduction gear mechanism 17 having a fixed reduction ratio. The rotational power of the output shaft 16 is reduced to the fixed reduction ratio between the reduction drive gear 39 and the reduction driven gear 40. Since the reduction drive gear 39 and the reduction driven gear 40 configure the pair of cylindrical gears, the reduction drive gear 39 and the reduction driven gear 40 may be gears, helical gears, or double-helical gears. Since the reduction drive gear 39 and the reduction driven gear 40 are configured to be the pair of cylindrical gears, the strength of the pair of gears is easily increased compared with a case in which the reduction gear mechanism 17 is configured with a pair of conical gears.

Figure 6:
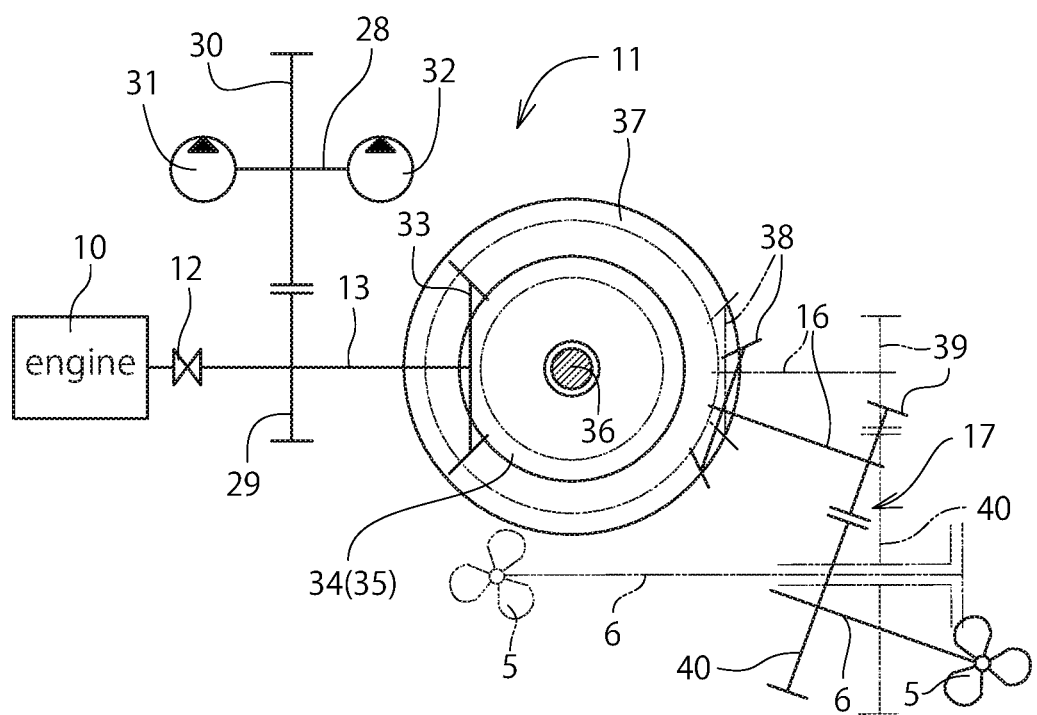
FIG. 6 is a single-line diagram illustrating the positional relationships between a pair of bevel gears engaged with each other according to modifications.

The relay shaft 36 and the output shaft 16 are coupled to be able to transmit power via the pair of intersecting-shaft gears (pair of bevel gears), which include the relay bevel gear 37 and the output bevel gear 38. With this configuration, depending on the positional relationship between the relay bevel gear 37 and the output bevel gear 38, which are engaged with each other, the inclination angle of the output shaft 16 with respect to the input shaft 13 as viewed from the side and thus the shaft angle of the propeller shaft 6 can be set to various angles. Thus, for example, in the V-drive reverse gear 11, the shaft angle of the propeller shaft 6 may be easily increased. The reverse gear 11 may be easily changed to an angle-drive reverse gear 11 illustrated in FIG. 6 with a solid line or to a parallel-shaft reverse gear 11 illustrated in FIG. 6 with an imaginary line. That is, the reverse gear 11 is easily applied to a plurality of models and specifications of the watercraft 1 by only developing variations of the housing 18 without changing the basic structure of the power transmission in the reverse gear 11. This eliminates the need for producing the reverse gear 11 that differs depending on models and specifications and thus reduces the production costs of models and specifications as a whole.

In particular, in the first embodiment, the forward and reverse clutches 14 and 15 and the forward and reverse bevel gears 34 and 35 are located on the relay shaft 36, which extends in the lateral direction. This configuration reduces the height of the housing 18 of the reverse gear 11 and the length of the housing 18 in the fore-and-aft direction and thus reduces the size of the entire reverse gear 11. This consequently increases the space in the watercraft such as the occupant's space S (refer to FIG. 1) that is often formed above the reverse gear 11. Thus, for example, a space for mounting the operator's seat 7 is provided above the reverse gear 11, and the reverse gear 11 is allowed to be mounted on the watercraft 1 that has a limited height.

When the forward/reverse lever in the cockpit 3 is manipulated to a forward position to connect the forward clutch 14 and disconnect the reverse clutch 15, the forward bevel gear 34 is coupled to the relay shaft 36 via the forward clutch 14 to be unable to rotate relative to each other. Thus, the rotational power of the engine 10 is transmitted from the input bevel gear 33 on the input shaft 13 to the relay shaft 36 via the forward bevel gear 34 and is transmitted from the relay bevel gear 37 on the relay shaft 36 to the output shaft 16 via the output bevel gear 38. The rotational power transmitted to the output shaft 16 is transmitted to the propeller shaft 6 via the reduction gear mechanism 17. As a result, the watercraft 1 is brought into a forward state in which the rotational power of the engine 10 is transmitted to the propeller shaft 6 as the output in the forward direction. The forward traveling speed of the watercraft 1 during normal traveling is adjusted by the throttle lever in the cockpit 3.

When the forward/reverse lever is manipulated to a reverse position to connect the reverse clutch 15 and disconnect the forward clutch 14, the reverse bevel gear 35 is coupled to the relay shaft 36 via the reverse clutch 15 to be unable to rotate relative to each other. Thus, the rotational power of the engine 10 is transmitted from the input bevel gear 33 on the input shaft 13 to the relay shaft 36 via the reverse bevel gear 35 and is transmitted from the relay bevel gear 37 on the relay shaft 36 to the output shaft 16 via the output bevel gear 38. The rotational power transmitted to the output shaft 16 is transmitted to the propeller shaft 6 via the reduction gear mechanism 17. As a result, the watercraft 1 is brought into a reverse state in which the rotational power of the engine 10 is transmitted to the propeller shaft 6 as the output in the reverse direction. The reverse traveling speed of the watercraft 1 during normal traveling is also adjusted by the throttle lever.

When the forward/reverse lever is manipulated to a neutral position so that the forward clutch 14 and the reverse clutch 15 are both disconnected, the watercraft 1 is brought into a neutral state in which the rotational power of the engine 10 is not transmitted to the output shaft 16 and thus not transmitted to the propeller shaft 6.

Figure 7:
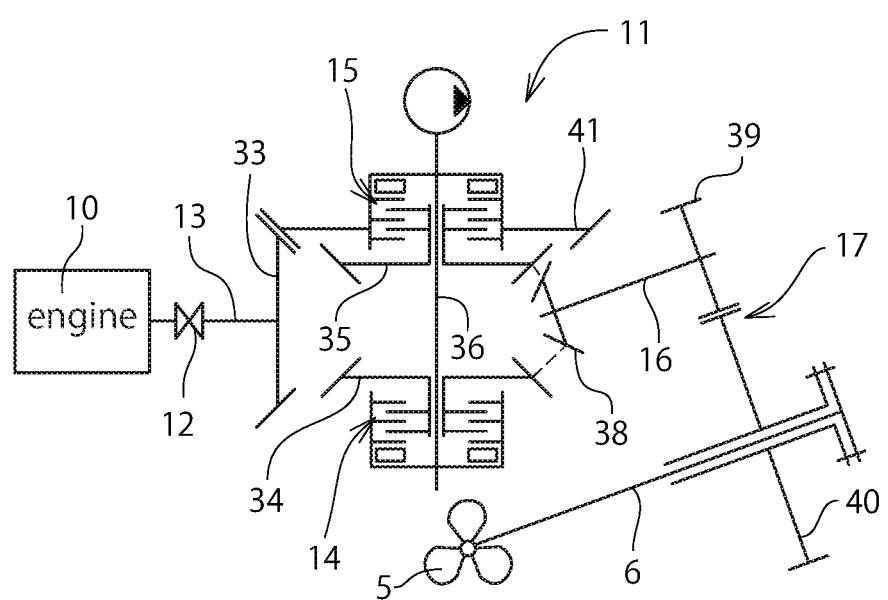
FIG. 7 is a single-line diagram of a power transmission system of a reverse gear according to a second embodiment.

FIG. 7 illustrates a reverse gear 11 according to a second embodiment. In the following embodiments, like or the same reference numerals are given to those components that have like or the same configuration and operation as the corresponding components of the first embodiment and detailed explanations are omitted.

In the second embodiment, the forward clutch 14, the forward bevel gear 34, the reverse bevel gear 35, and the reverse clutch 15 are arranged next to one another on the relay shaft 36. Instead of the relay bevel gear 37 on the relay shaft 36 in the first embodiment, a transmission bevel gear 41 is provided on the outer circumference of the reverse clutch 15. The transmission bevel gear 41 is constantly engaged with the input bevel gear 33, which is fixed on the front end section of the input shaft 13. The output bevel gear 38, which is provided on the rear portion of the output shaft 16, is constantly engaged with both the forward bevel gear 34 and the reverse bevel gear 35.

With this configuration, depending on the positional relationship between the output bevel gear 38 and the forward and reverse bevel gears 34 and 35, which are engaged with the output bevel gear 38, the inclination angle of the output shaft 16 with respect to the input shaft 13 as viewed from the side and thus the shaft angle of the propeller shaft 6 can be set to various angles. The output bevel gear 38 and the forward and reverse bevel gears 34 and 35 configure the pair of intersecting-shaft gears. This configuration provides the same operational advantage as the first embodiment. That is, in the V-drive reverse gear 11, the shaft angle of the propeller shaft 6 is easily increased. The reverse gear 11 may be easily changed to an angle-drive reverse gear 11 or a parallel-shaft reverse gear 11. The relay shaft 36 of the second embodiment is configured to be constantly rotated by the rotational power when the engine 10 is driven. Thus, the relay shaft 36 can be utilized as a PTO shaft for outputting the power.

Figure 8:
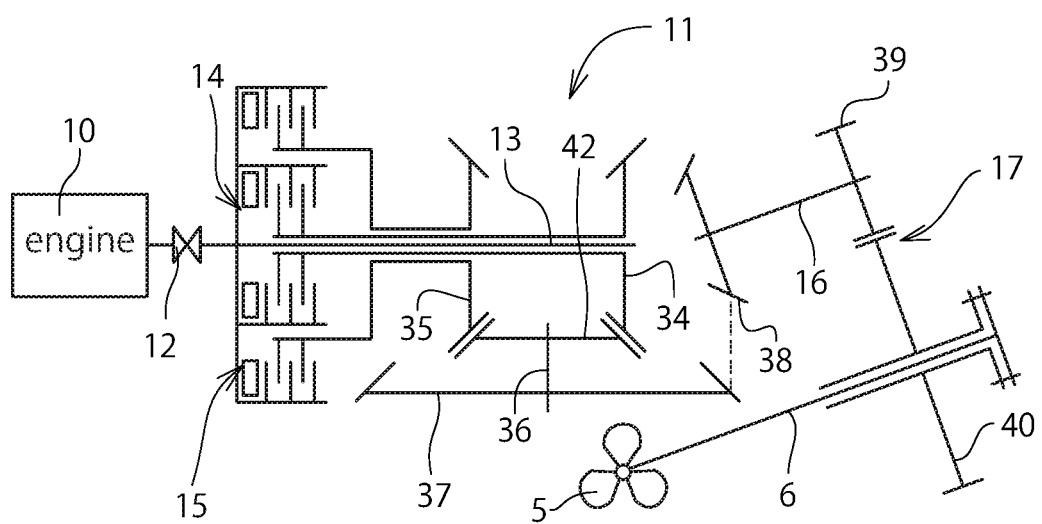
FIG. 8 is a single-line diagram of a power transmission system of a reverse gear according to a third embodiment.

FIG. 8 illustrates a reverse gear 11 according to a third embodiment. In the third embodiment, the forward clutch 14 is located on the input shaft 13, and the reverse clutch 15 is located on the outer circumference of the forward clutch 14 to cover the forward clutch 14. The forward and reverse bevel gears 34 and 35 are rotationally fitted onto the input shaft 13 downstream of the forward and reverse clutches 14 and 15 in a position that face each other. The reverse bevel gear 35 is located upstream of the forward bevel gear 34. The forward clutch 14 of the third embodiment connects and disconnects power transmission from the input shaft 13 to the forward bevel gear 34, and the reverse clutch 15 of the third embodiment connects and disconnects the power transmission from the input shaft 13 to the reverse bevel gear 35. A relay input bevel gear 42 is provided on the relay shaft 36 upstream of the relay bevel gear 37. The relay input bevel gear 42 is constantly engaged with the forward bevel gear 34 and the reverse bevel gear 35.

With this configuration also, depending on the positional relationship between the relay bevel gear 37 and the output bevel gear 38, which are engaged with each other, the inclination angle of the output shaft 16 with respect to the input shaft 13 as viewed from the side and thus the shaft angle of the propeller shaft 6 can be set to various angles. The relay bevel gear 37 and the output bevel gear 38 configure the pair of intersecting-shaft gears. This configuration provides the same operational advantages as the first embodiment.

Figure 9:
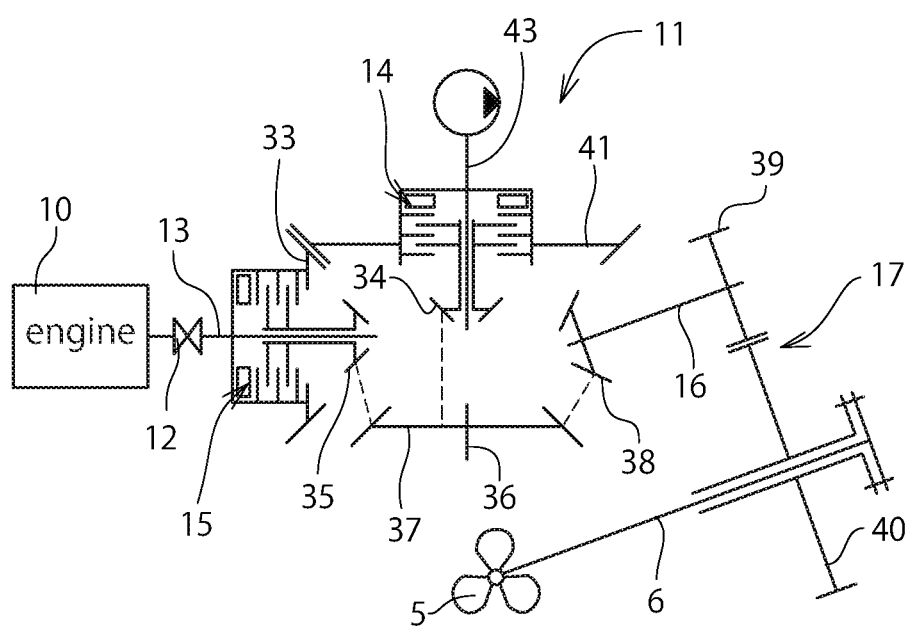
FIG. 9 is a single-line diagram of a power transmission system of a reverse gear according to a fourth embodiment.

FIG. 9 illustrates a reverse gear 11 according to a fourth embodiment. In the fourth embodiment, the reverse clutch 15 and the reverse bevel gear 35 are located on the input shaft 13. The reverse clutch 15 of the fourth embodiment connects and disconnects the power transmission from the input shaft 13 to the reverse bevel gear 35. The reverse bevel gear 35 is constantly engaged with the relay bevel gear 37 on the relay shaft 36. The input bevel gear 33 is provided on the outer circumference of the reverse clutch 35. In the fourth embodiment, the reverse gear 11 includes a forward shaft 43 that extends in the vertical direction. The forward clutch 14 and the forward bevel gear 34 are located on the forward shaft 43. The forward clutch 14 of the fourth embodiment connects and disconnects the power transmission from the forward shaft 43 to the forward bevel gear 34. The transmission bevel gear 41 is provided on the outer circumference of the forward clutch 14. The transmission bevel gear 41 is constantly engaged with the input bevel gear 33, which is provided on the outer circumference of the reverse clutch 35. The forward bevel gear 34 is constantly engaged with the relay bevel gear 37 on the relay shaft 36. The output bevel gear 38 on the output shaft 16 is also constantly engaged with the relay bevel gear 37 on the relay shaft 36. That is, three bevel gears including the forward, reverse, and output bevel gears 34, 35, and 38 are engaged with the relay bevel gear 37.

With this configuration also, depending on the positional relationship between the relay bevel gear 37 and the output bevel gear 38, which are engaged with each other, the inclination angle of the output shaft 16 with respect to the input shaft 13 as viewed from the side and thus the shaft angle of the propeller shaft 6 can be set to various angles. The relay bevel gear 37 and the output bevel gear 38 constitute the pair of intersecting-shaft gears. This configuration provides the same operational advantages as the first embodiment. The forward shaft 43 of the fourth embodiment is configured to be constantly rotated by the rotational power when the engine 10 is driven. Thus, the forward shaft 43 can be used as a PTO shaft for outputting the power.

Figure 10:
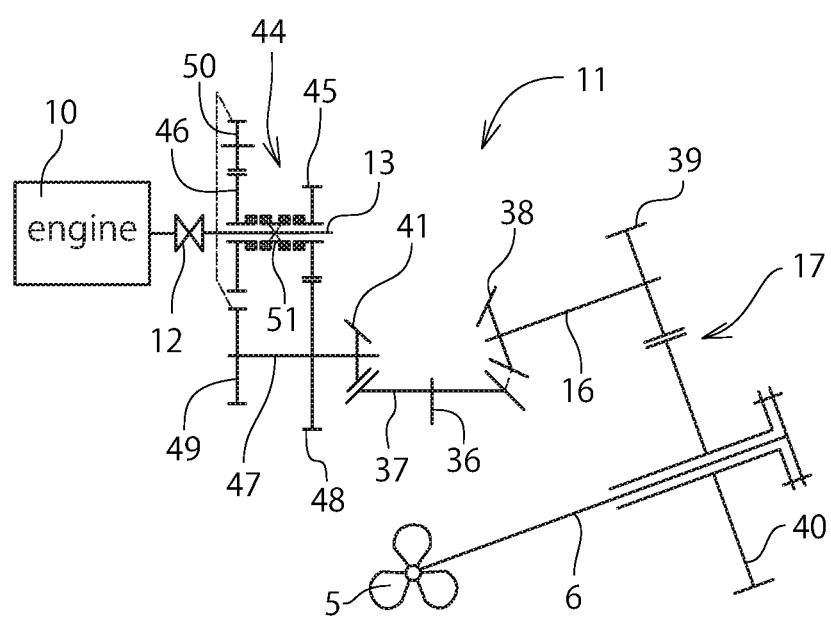
FIG. 10 is a single-line diagram of a power transmission system of a reverse gear according to a fifth embodiment.

FIG. 10 illustrates a reverse gear 11 according to a fifth embodiment. In the fifth embodiment, a forward/reverse switching mechanism 44 is located between the input shaft 13 and the relay shaft 36. In this case, a reverse input gear 46 and a forward input gear 45 are rotationally fitted onto the input shaft 13. A reverse output gear 49 and a forward output gear 48 are secured to a counter shaft 47. The counter shaft 47 extends parallel to the input shaft 13. The reverse input gear 46 on the input shaft 13 is coupled to the reverse output gear 49 on the counter shaft 47 via a reversing gear 50. The forward input gear 45 on the input shaft 13 is constantly engaged with the forward output gear 48 on the counter shaft 47. A forward/reverse switching clutch 51 is a dog clutch and is located on the input shaft 13 between the reverse input gear 46 and the forward input gear 45. The forward/reverse switching clutch 51 selectively couples the reverse input gear 46 and the forward input gear 45 to the input shaft 13. The transmission bevel gear 41, which is provided on the downstream section of the counter shaft 47, is constantly engaged with the relay bevel gear 37 on the relay shaft 36.

With this configuration also, depending on the positional relationship between the relay bevel gear 37 and the output bevel gear 38, which are engaged with each other, the inclination angle of the output shaft 16 with respect to the input shaft 13 as viewed from the side and thus the shaft angle of the propeller shaft 6 can be set to various angles. The relay bevel gear 37 and the output bevel gear 38 configure the pair of intersecting-shaft gears. This configuration provides the same operational advantages as the first embodiment.

Figure 11:
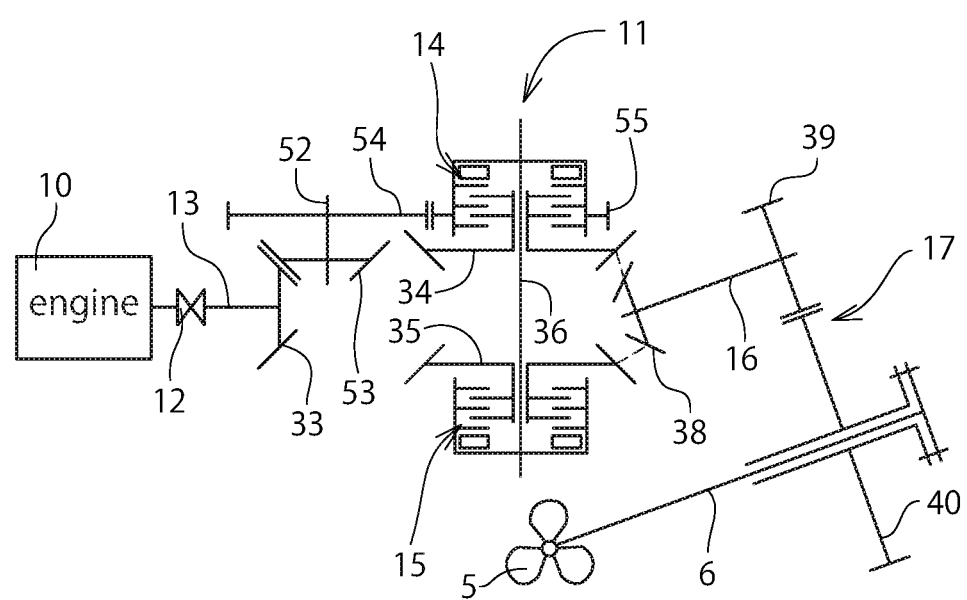
FIG. 11 is a single-line diagram of a power transmission system of a reverse gear according to a sixth embodiment.

FIG. 11 illustrates a reverse gear 11 according to a sixth embodiment. The sixth embodiment is a modification of the second embodiment illustrated in FIG. 7. In the sixth embodiment, the reverse gear 11 includes an intermediate shaft 52. The intermediate shaft 52 extends in the lateral direction that intersects with the input shaft 13. The intermediate shaft 52 extends parallel to the relay shaft 36. The input bevel gear 33, which is fixed to the front end section of the input shaft 13, is constantly engaged with an intermediate bevel gear 53. The intermediate bevel gear 53 is provided on the upstream section of the intermediate shaft 52. In the sixth embodiment, the forward clutch 14, the forward bevel gear 34, the reverse bevel gear 35, and the reverse clutch 15 are arranged one next to another on the relay shaft 36 from the left end in this order. A transmission gear 55 is provided on the outer circumference of the forward clutch 14. The transmission gear 55 is constantly engaged with an intermediate gear 54. The intermediate gear 54 is provided on the downstream section of the intermediate shaft 52. The output bevel gear 38, which is provided on the rear portion of the output shaft 16, is constantly engaged with both the forward bevel gear 34 and the reverse bevel gear 35.

With this configuration also, depending on the positional relationship between the output bevel gear 38 and the forward and reverse bevel gears 34 and 35, which are engaged with the output bevel gear 38, the inclination angle of the output shaft 16 with respect to the input shaft 13 as viewed from the side and thus the shaft angle of the propeller shaft 6 can be set to various angles. The output bevel gear 38 and the forward and reverse bevel gears 34 and 35 configure the pair of intersecting-shaft gears. This configuration provides the same operational advantages as the first embodiment.

Figure 12A:
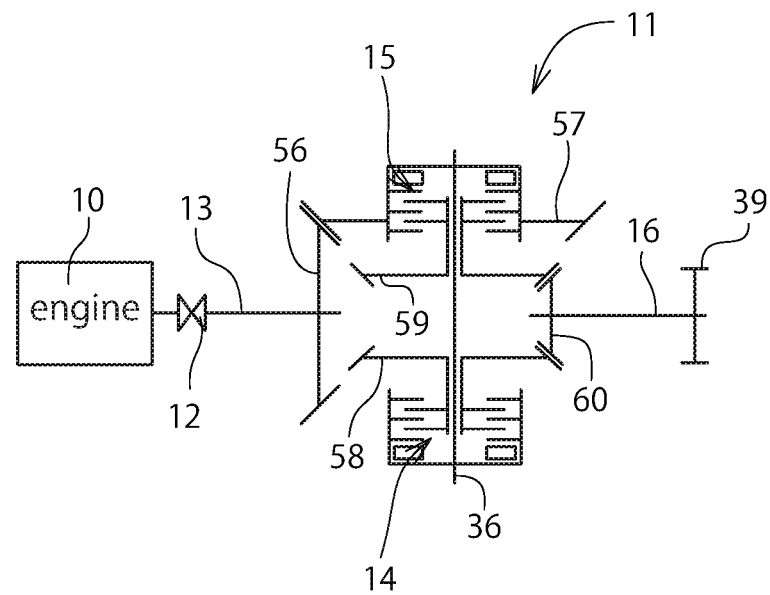
FIG. 12A is a single-line diagram of a power transmission system of a reverse gear according to a seventh embodiment.
Figure 12B:
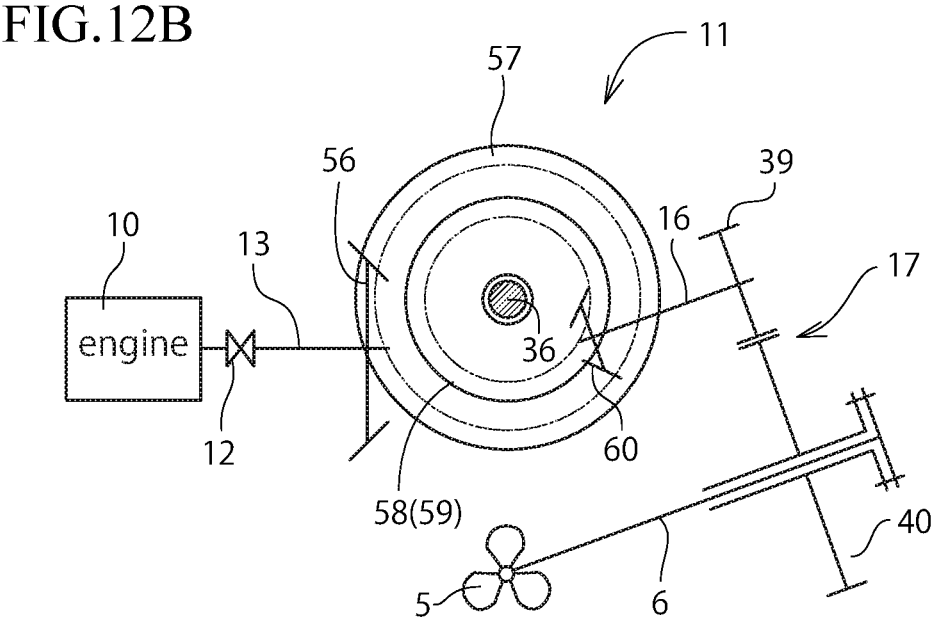
FIG. 12B is a single-line diagram illustrating the positional relationship between a pair of hypoid gears engaged with each other.

FIGS. 12A and 12B illustrate a reverse gear 11 according to a seventh embodiment. The seventh embodiment is also a modification of the second embodiment illustrated in FIG. 7. In the seventh embodiment, the relay shaft 36 and the output shaft 16 are set to be skew. The forward clutch 14, a forward hypoid gear 58, a reverse hypoid gear 59, and the reverse clutch 15 are arranged next to one another on the relay shaft 36. An output hypoid pinion 60 is provided on the rear portion of the output shaft 16. The output hypoid pinion 60 is constantly engaged with both the forward hypoid gear 58 and the reverse hypoid gear 59. In the seventh embodiment, the positional relationship between the input shaft 13 and the relay shaft 36 is also set to be skew. A transmission hypoid gear 57 is provided on the outer circumference of the reverse clutch 15. The transmission hypoid gear 57 is constantly engaged with an input hypoid pinion 56. The input hypoid pinion 56 is fixed to the front end section of the input shaft 13.

With this configuration, depending on the positional relationship between the output hypoid pinion 60 and the forward and reverse hypoid gears 58 and 59, which are engaged with the output hypoid pinion 60, the inclination angle of the output shaft 16 with respect to the input shaft 13 as viewed from the side and thus the shaft angle of the propeller shaft 6 can be set to various angles. This configuration provides the same operational advantages as the first embodiment. The engaging position of the output hypoid pinion 60 and the forward and reverse hypoid gears 58 and 59 can be located at a position lower than the relay shaft 36 as viewed from the side. Thus, the space for mounting the propeller shaft 6 is easily provided.

Figure 13A:
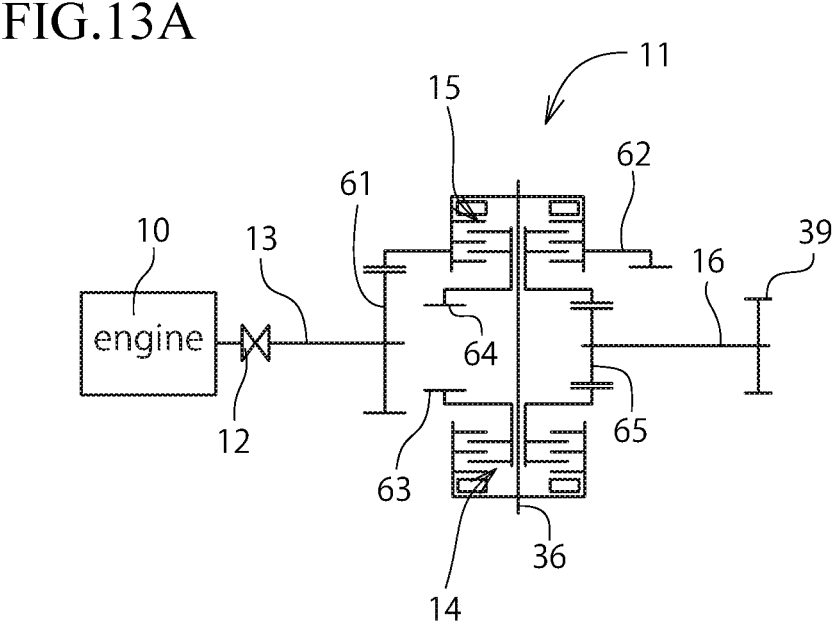
FIG. 13A is a single-line diagram of a power transmission system of a reverse gear according to an eighth embodiment.
Figure 13B:
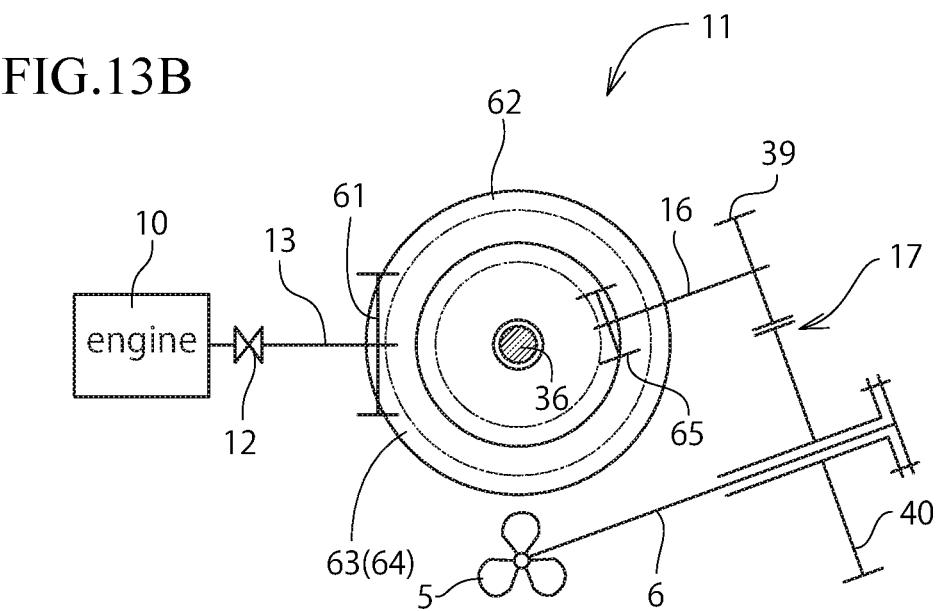
FIG. 13B is a single-line diagram illustrating the positional relationship between a pair of face gears engaged with each other.

FIGS. 13A and 13B illustrate a reverse gear 11 according to an eighth embodiment. The eighth embodiment is also a modification of the second embodiment illustrated in FIG. 7. In the eighth embodiment, the forward clutch 14, a forward face gear 63, a reverse face gear 64, and the reverse clutch 15 are arranged one next to another on the relay shaft 36. A transmission face gear 62 is provided on the outer circumference of the reverse clutch 15. The transmission face gear 62 is constantly engaged with an input pinion 61. The input pinion 61 is fixed to the front end section of the input shaft 13. An output pinion 65 is provided on the rear portion of the output shaft 16. The output pinion 65 is constantly engaged with both the forward face gear 63 and the reverse face gear 64.

With this configuration also, depending on the positional relationship between the output pinion 65 and the forward and reverse face gears 63 and 64, which are engaged with the output pinion 65, the inclination angle of the output shaft 16 with respect to the input shaft 13 as viewed from the side and thus the shaft angle of the propeller shaft 6 can be set to various angles. This configuration provides the same operational advantages as the first embodiment.

The configuration of each part of the present invention is not limited to the illustrated embodiments, but may be modified in various forms without departing from the scope of the invention.

What is claimed is:

1. A reverse gear comprising:
    an input shaft configured to receive rotational power of a main engine;
    a forward clutch configured to transmit the rotational power of the input shaft as forward output;
    a reverse clutch configured to transmit the rotational power of the input shaft as reverse output;
    an output shaft configured to output the rotational power transmitted via the forward clutch and the reverse clutch to a propeller shaft; and
    a relay shaft intersecting the input shaft and configured to relay the rotational power from the forward clutch and the reverse clutch toward the output shaft, the relay shaft and the output shaft being coupled to each other via a pair of intersecting-shaft gears to be able to transmit power.

2. The reverse gear according to claim 1, wherein the forward clutch and the reverse clutch are disposed on the relay shaft.

3. The reverse gear according to claim 1, wherein the output shaft and the propeller shaft are coupled to each other through a reduction mechanism to be able to transmit power, and the reduction mechanism comprises a pair of cylindrical gears.

4. The reverse gear according to claim 1, wherein the forward clutch and the reverse clutch comprise a different clutch capacity from each other.

5. A watercraft comprising a reverse gear, the reverse gear comprising:
    an input shaft configured to receive rotational power of a main engine;
    a forward clutch configured to transmit the rotational power of the input shaft as forward output;
    a reverse clutch configured to transmit the rotational power of the input shaft as reverse output;
    an output shaft configured to output the rotational power transmitted via the forward clutch and the reverse clutch to a propeller shaft; and
    a relay shaft intersecting the input shaft and configured to relay the rotational power from the forward clutch and the reverse clutch toward the output shaft, the relay shaft and the output shaft being coupled to each other via a pair of intersecting-shaft gears to be able to transmit power,
    wherein the main engine is located at a position further rearward than the watercraft,
    wherein the input shaft extends approximately horizontally in a forward direction of a length of the watercraft,
    wherein the relay shaft is located at position further forward than the input shaft and extends in a left-right direction,
    wherein the output shaft extends in a diagonally upward-forward direction toward the watercraft, and
    wherein the propeller shaft is parallel to the output shaft and coupled to the output shaft via a gear means to be able to move together with the output shaft, the propeller shaft comprising an output shaft extending in a diagonally downward-rearward direction toward the main engine.

* * * * *